(12) United States Patent
Canivell Grifols et al.

(10) Patent No.: US 9,401,131 B2
(45) Date of Patent: Jul. 26, 2016

(54) GUITAR-SECURING DEVICE

(75) Inventors: Jordi Canivell Grifols, Barcelona (ES);
Ricard Escalada Recto, Barcelona (ES);
David Mañosa Ripoll, Barcelona (ES)

(73) Assignee: LLEVINAC, S.L., Barcelona (ES)

( * ) Notice: Subject to any disclaimer, the term of this patent is extended or adjusted under 35 U.S.C. 154(b) by 387 days.

(21) Appl. No.: 13/884,214

(22) PCT Filed: Apr. 14, 2011

(86) PCT No.: PCT/ES2011/000124
§ 371 (c)(1),
(2), (4) Date: Jul. 22, 2013

(87) PCT Pub. No.: WO2012/062939
PCT Pub. Date: May 18, 2012

(65) Prior Publication Data
US 2013/0292524 A1    Nov. 7, 2013

(30) Foreign Application Priority Data
Nov. 9, 2010 (ES) ................................. 201031647

(51) Int. Cl.
*G10G 5/00* (2006.01)
*F16M 13/02* (2006.01)
*A47F 7/00* (2006.01)

(52) U.S. Cl.
CPC ............... *G10G 5/00* (2013.01); *A47F 7/0028* (2013.01); *F16M 13/022* (2013.01)

(58) Field of Classification Search
CPC ................................ G10G 5/00; A47F 7/0028

USPC ............ 248/121; 84/267, 290, 327, 421, 453, 84/329
See application file for complete search history.

(56) References Cited

U.S. PATENT DOCUMENTS

| 2,559,200 A | * | 7/1951 | Schaf ........................ G10G 5/00 84/267 |
| 4,037,815 A | | 7/1977 | DeLano |
| 4,159,092 A | * | 6/1979 | DeLano ............... F16M 11/041 248/276.1 |
| 4,742,751 A | * | 5/1988 | Cherry ..................... G10G 5/00 84/327 |
| 6,772,981 B1 | | 8/2004 | Yu et al. |
| 2009/0282963 A1 | * | 11/2009 | Morrow .................... A47F 7/00 84/290 |
| 2010/0163693 A1 | | 7/2010 | Wang |

FOREIGN PATENT DOCUMENTS

JP    11-249647    9/1999

OTHER PUBLICATIONS

International Search Report dated Aug. 19, 2011 filed in corresponding International Application Serial No. PCT/ES2011/000124.

* cited by examiner

*Primary Examiner* — Todd M Epps
(74) *Attorney, Agent, or Firm* — RatnerPrestia

(57) ABSTRACT

Guitar-securing device characterized in that it comprises an element for fastening to a surface, which has an arm, a structural element, connected to said arm, and that runs via the rear part of the guitar, said structural element having at least a first element for connection to a first stud for a strap of said guitar and/or an element for joining to the neck of the guitar.

6 Claims, 24 Drawing Sheets

GUITAR-SECURING DEVICE

CROSS-REFERENCE TO RELATED APPLICATIONS

This application is a U.S. National Stage pursuant to 35 U.S.C. §371 of International Patent Application PCT/ES2011/000124, filed Apr. 14, 2011 and published as WO 2012/062939 on May 18, 2012, which claims priority to Spanish Patent Application 201031647, filed on Nov. 9, 2010, all of which are incorporated herein by reference in their entireties for all purposes.

FIELD OF THE INVENTION

The present invention relates to a guitar-securing device, for example for attaching it to a wall, or securing it to a pedestal.

Guitars have become collector's items. There is therefore a need for display units for guitars. However display units of the known type either enclose the guitar, as a result of which they are very bulky and it is difficult to appreciate the three-dimensionality of the guitar, and/or they are also visible, affecting their aesthetics.

The present invention provides a solution to this market need by providing a display device for guitars through which a guitar can be secured to a surface, ideally a wall, and which is not visible at first sight, providing the effect that the guitar is suspended in space or screwed to the surface, all without damaging the guitar.

In particular, the present invention comprises a guitar-securing device characterised in that it comprises:
- an attachment member, provided with an arm, for attachment to a surface,
- a structural member connected to that arm, which passes along the back portion of the guitar, this structural member having at least a first connecting member to a first support stud for the belting of the guitar, and/or a connecting member to the neck of the guitar.

The structure, which is located on the back portion of the guitar, makes it possible to secure it with minimum visual impact.

Preferably, the structural member comprises a laminar member located on the back face of the guitar. In order to avoid it from being seen, the laminar member may be in the form of a plate whose contour matches the guitar which has to be secured.

More preferably, the attachment member to the wall has a ball and socket joint at the end of the arm; this means that the guitar can be positioned in a way which is not parallel to the surface (for example, the wall) to which the device is secured, providing a better feel for the three-dimensionality of the guitar.

Again preferably, the securing member is connected to a pedestal.

Alternatively, the securing member may comprise a plate with openings and bolts fotr connection to a wall.

Even more preferably, an intermediate connecting member with the ability to rotate with respect to the ball and socket joint and to which the structural member is joined is located between the structural member and the ball and socket joint.

Preferably, the intermediate member has a wheel to adjust the angle of rotation between the ball and socket joint and the structural member.

A foam material may be placed between the laminar member and the back face of the guitar to protect the guitar.

Likewise, the present invention provides different means of adjustment which can be used to adjust a device to guitars of different shapes and sizes.

For this, the structural member preferably comprises a second laminar member connected to the first through means which allow the relative position between the two members to be varied.

Even more preferably, these means comprise at least one elongated opening in one of the laminar members, a set of smaller openings corresponding to the elongated opening and located in the laminar member which does not contain the aforesaid elongated opening, and at least one pin which is capable of passing through the elongated opening and one of the corresponding smaller openings.

Even more preferably, the laminar member comprises a set of orifices which allow the attachment member to be joined to the wall and the structural member in different relative positions.

Advantageously, the first connecting member is a laminar bracket connected to the structural member, for connection to a support stud for the belting of the guitar.

More advantageously, the laminar bracket and the structural member are connected together by means of an opening located in the laminar bracket or in the structural member, a corresponding elongated opening and a pin capable of passing through both openings.

In an even more advantageous way, the structural member comprises a set of openings close to each other so that the point of connection to the laminar bracket can be varied.

Also in an even more advantageous manner, the stud and the laminar bracket are joined by means of an intermediate laminar member which has an opening to receive the stud and an elongated opening corresponding to a smaller opening in the laminar bracket arranged in such a way that one pin passes through them.

The laminar bracket may comprise a recess to receive the support stud for the belting of the guitar.

The present invention also preferably provides a U-shaped member to support the neck of the guitar.

More preferably, the U-shaped member is attached to the structural member in such a way that the U encloses the back face and sides of the neck, leaving the side of the neck with the strings of the guitar largely unobstructed.

Alternatively, it has a connecting member to the neck which comprises a contact surface with the back of the neck and a crook-shaped member to contact the part of the neck over which the guitar strings run.

Preferably, it has a connecting member to the support stud for the belting of the guitar arranged in such a way that there is a connection with the support stud for the belting of the guitar located in the area opposite the neck of the guitar.

Even more preferably, it further comprises a connecting member to a support stud for the belting of the guitar located so as to form a connection with a support stud for the belting of the guitar located on one of the shoulders of the guitar.

The present invention also provides different preferred arrangements of connecting members to the guitar which will be preferably applied to guitars of different types, such as acoustic guitars, electric guitars or generic guitars.

Thus, it comprises a connecting member to the neck and a connecting member to the support stud for the belting of the guitar.

Preferably, it comprises two connecting members to the neck.

Alternatively, the invention may be without connecting members to the guitar neck or may be without connecting members to the support stud for the belting of the guitar.

For a better understanding of the invention, drawings of embodiments of this invention are appended by way of an explanatory but not limiting example.

FIGS. 1 to 5 illustrate a first embodiment of a device -1- according to the present invention, and its application to an electric guitar -100-.

Figure 1:
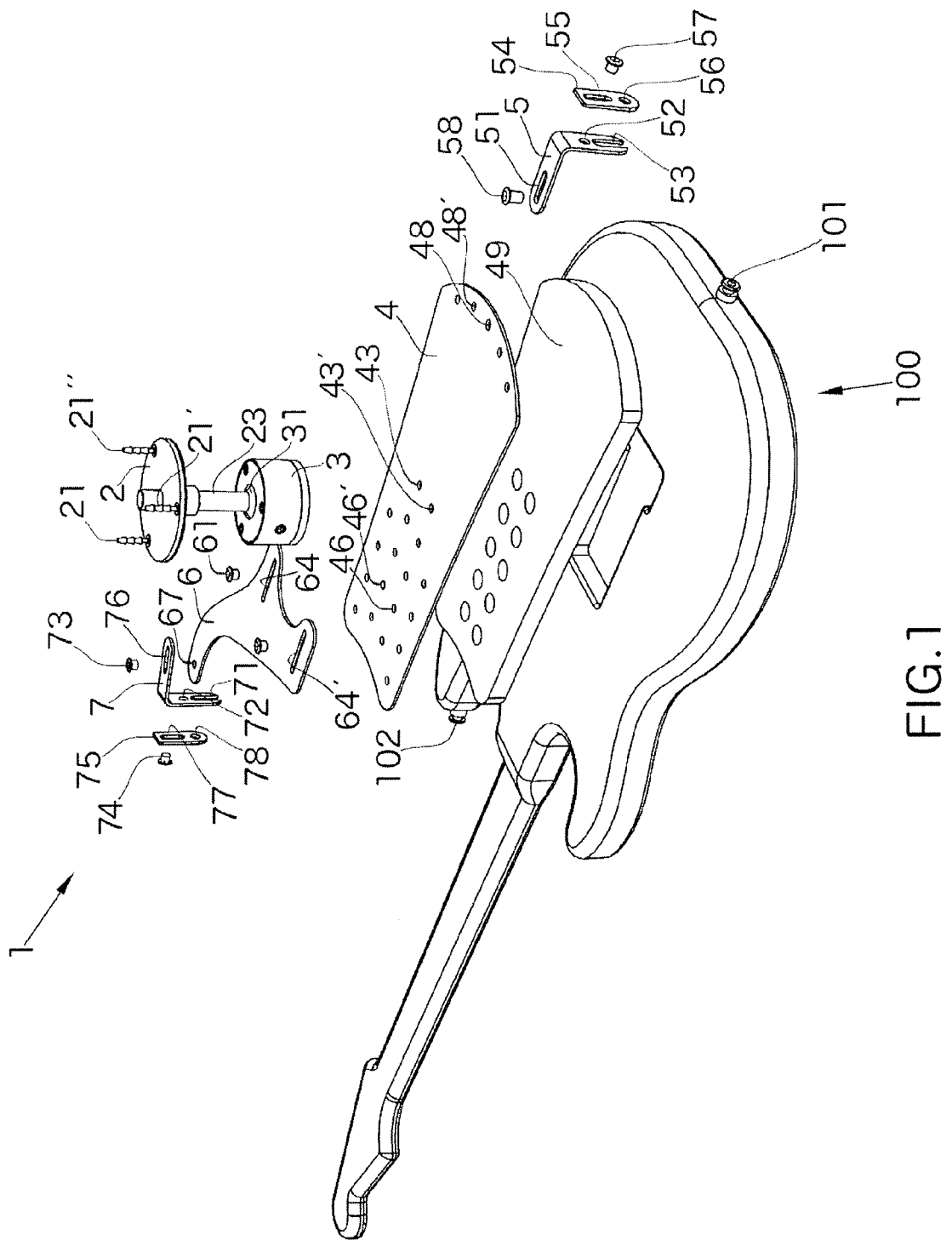
FIG. 1 illustrates a perspective view of an electric guitar with an exploded view of the different parts of a first embodiment of a device according to the present invention.

Device -1- for suspending a guitar -100- in FIGS. 1 to 5 comprises a wall disk -2-, which is pierced, with connecting members to a wall -21-, -21'-, -21"-. An arm -23- connecting to a ball and socket joint -3- projects from the disk perpendicularly. The ball and socket joint illustrated may be a commercially available type of ball and socket joint and comprises a spherical member -31- within a housing, which allows it to be connected to a surface, and adjustment of the position of the ball and socket joint through pressure. Spherical member -31- is attached directly to arm -23-.

The joining surface to a surface of the housing of the ball and socket joint is connected by means of a threaded member or a pin to a structural member comprising a plate -4-. Plate -4- comprises numerous openings which allow this to be connected to different components in different positions, so that the same device can be used to suspend different guitars. As will be seen in the figures, plate -4- extends along the back part of guitar -100-.

Thus, in its central position, the plate has different orifices -43-, -43'- which make it possible to adjust the connecting point at which the ball and socket joint -3- is attached to plate -4-.

A foam material -49- is placed between plate -4- and guitar -100- to protect the guitar from damage. This foam material may for example be material marketed under the trade name of Plastazote.

In the part corresponding to the extremity opposite the neck of the guitar, the plate has a set of orifices -48-, -48'- which make it possible to adjust the points of attachment of the connecting members to support stud -101- for the belting of the guitar located at that point.

The connecting members to stud -101- in the example illustrated comprise bracket -5- made of sheet metal which has an elongated opening -51- and a pin -58- for connection to one of orifices -48-, -48'- in plate -4-. This elongated opening -51- makes it possible to adjust the distance between the end of plate -4- and stud -101-, which can vary according to the dimensions of the guitar and the point at which device -1- is located with respect to guitar -100-. A closed circular orifice -52- and a recess or open elongated opening -53- are located on the other limb of bracket -5-. Recess or open elongated opening -53- is designed to allow stud -101- of guitar -100- to enter laterally. Closed circular orifice -52- acts together with the other elongated opening -55- belonging to an intermediate plate -54- which also comprises a closed circular orifice -56- to receive stud -101- of guitar -100-. This set of closed orifices and elongated openings allows the height of the guitar to be adjusted.

As regards the more proximal part of the neck, plate -4- is connected to a second plate -6- whose purpose is to allow it to be fitted to guitars of different geometries as regards the length of the sound box and the relative position of the stud.

This second plate -6- has two elongated openings -64-, -64'- which act as slides and are joined to corresponding orifices -46-, -46'- in main plate -4-. The elongated openings make it possible to join together the two plates -4-, -6- in different relative positions using pins -61-. The second plate has a more specific geometry, having an arm which extends towards the shoulder of the guitar which has a stud -102-. The connection between the end of arm -6- and stud -102- on the shoulder of the guitar is made by means similar to those used for the other stud.

Specifically, in this case, an orifice -67- is located at the end of the arm of plate -67- through which a pin -73- connects with a bracket -7- which has an elongated opening -76-. In the other limb of the bracket there is a closed circular orifice -72- for connection to an intermediate plate -75-. Bracket -7- also has a recess -74- to receive stud -102-. Intermediate plate -75- has an elongated opening -77- for connection to bracket -7- through a pin -74- and a closed circular orifice -78- to receive stud -102-. Intermediate plate -75- acts as a securing member for the connection and prevents stud -102- slipping out of recess -74-.

Figure 2:
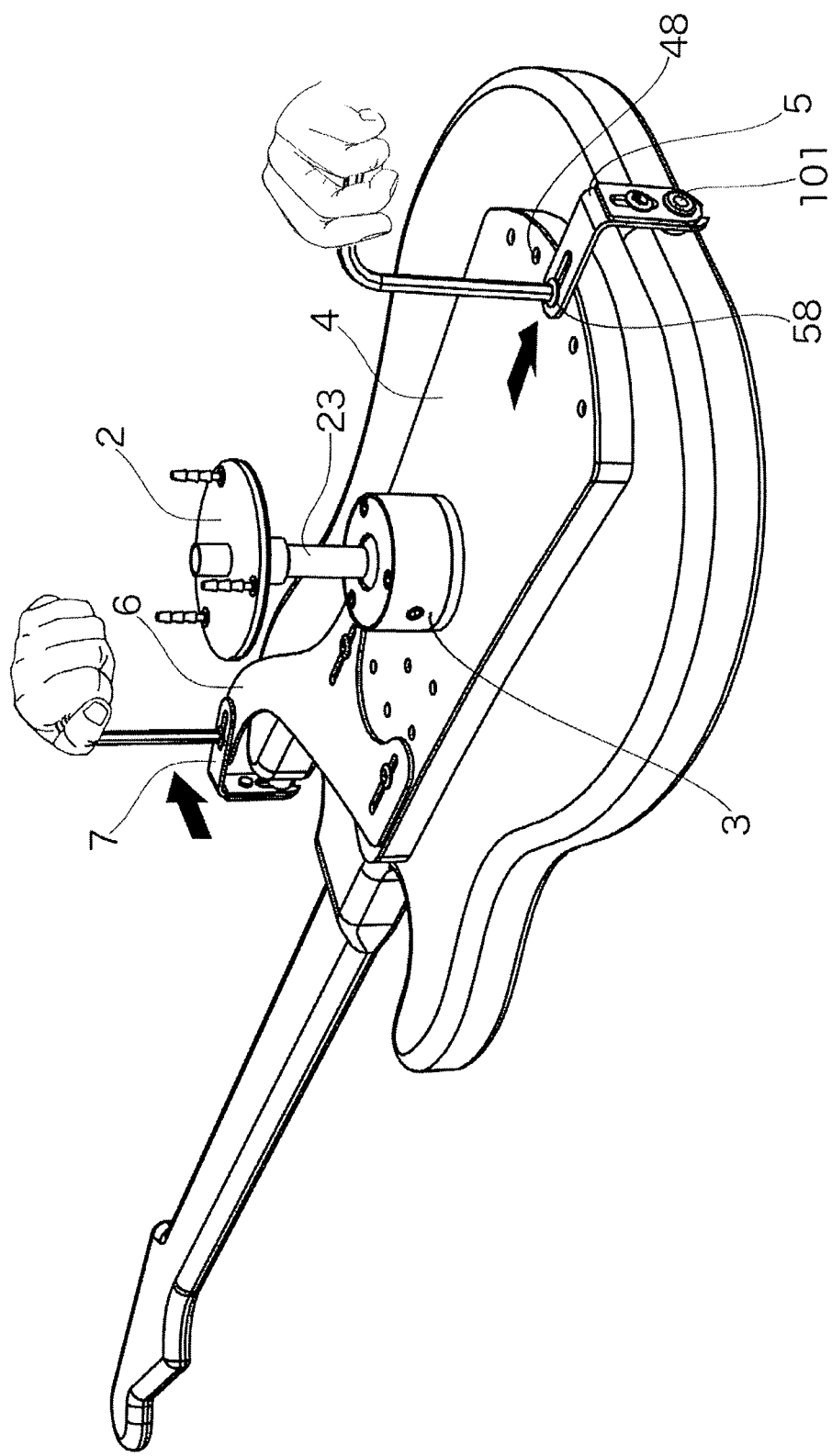
FIG. 2 is a perspective view illustrating a process of adjusting the first embodiment to the specific dimensions of the guitar illustrated.
Figure 3:
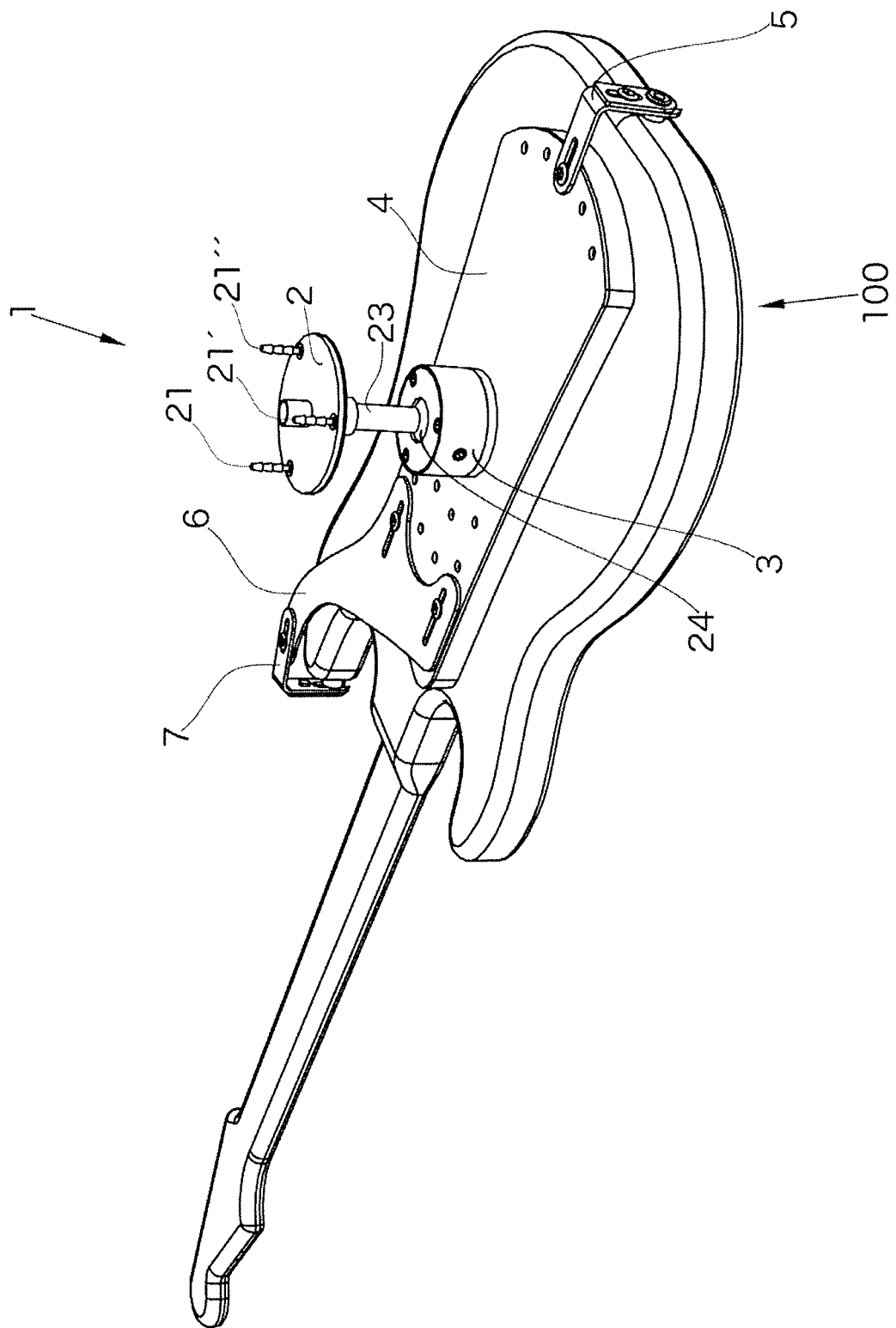
FIG. 3 is a perspective view of the first embodiment already mounted on an electric guitar.
Figure 4:
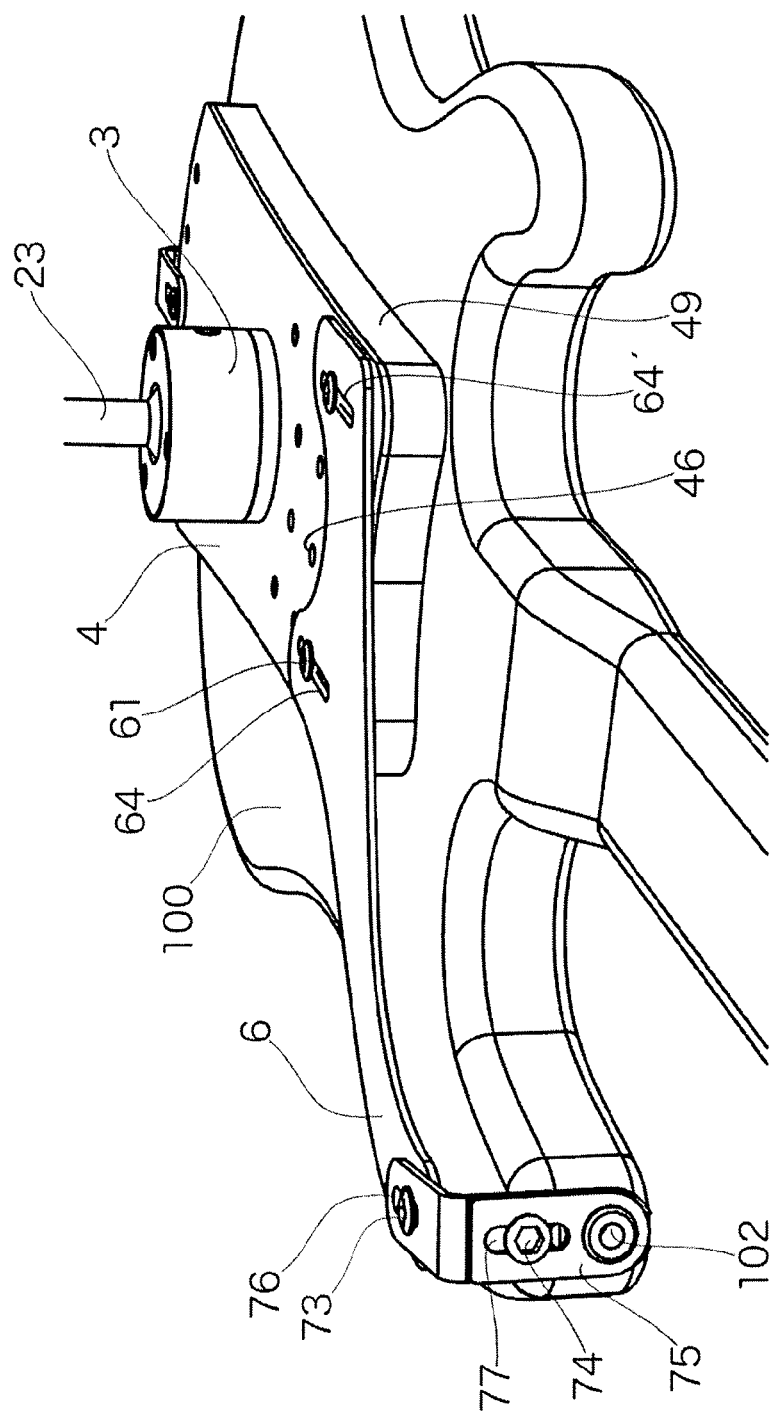
FIG. 4 is a perspective view in which the details of the connection between the device and the guitar in the vicinity of a support stud located on a shoulder of the guitar can be seen.
Figure 5:
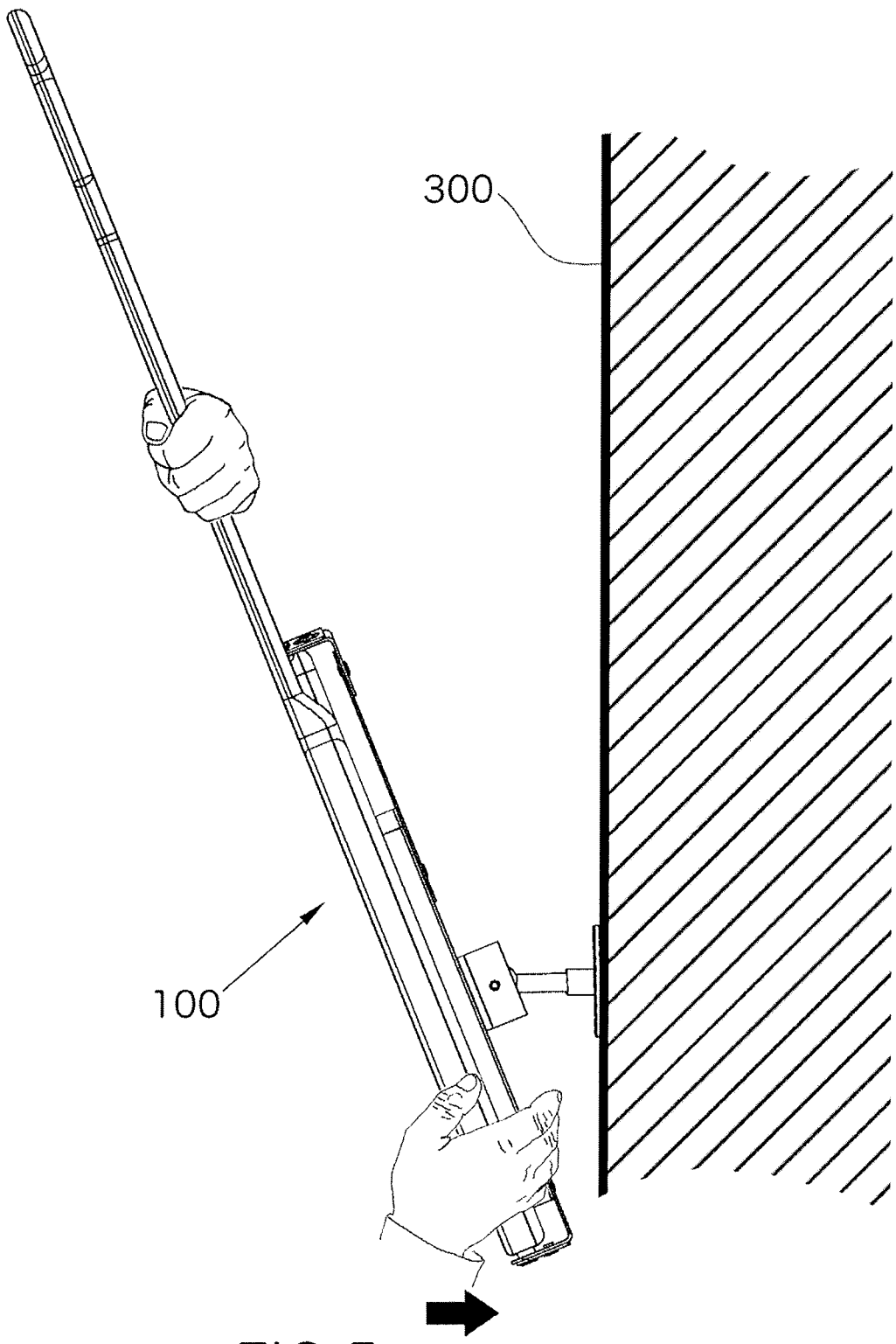
FIG. 5 is a diagrammatical view showing possibilities for positioning the first embodiment on a surface.

As will be seen in FIGS. 2 and 5, once device -1- has been fitted to guitar -100-, it is possible to adjust the spatial arrangement of guitar -100- by means of a ball and socket joint -3- (rotation, inclination with respect to surface -300-).

FIGS. 6 to 11 illustrate a second embodiment of the present invention. The second embodiment is intended for guitars -200- which (for technical or artistic reasons) have to be supported by both a stud -201- located at the point opposite to neck -202- of guitar -200- and another point located on neck -202-, such as, for example, specific acoustic guitars.

The securing device of the second embodiment is similar to that illustrated for the first embodiment, as a result of which identical or similar components have been referred to by the same numbers, and will not be explained in detail. The following explanation is therefore concentrated on those elements which differ between the second and the first embodiment.

In the second embodiment, an intermediate member -32- with a wheel -31- which makes it possible for main plate -4- to rotate with respect to the ball and socket joint -3- is fitted between the ball and socket joint -3- and main plate -4-. Second plate -6- of the structural member is shaped differently, given that its purpose is to act as a connection between the connection to neck -203- and main plate -4-. The connecting members to neck -203- of this second embodiment illustrated comprise a bracket -8- joined through a pin -81- and an elongated/circular opening assembly to the end of the armnn of second plate -6- which is in turn connected to a U-shaped member -82- extending beyond the back face and side surfaces of the neck, leaving the side of the neck with the strings of the guitar largely unobstructed.

Figure 12:
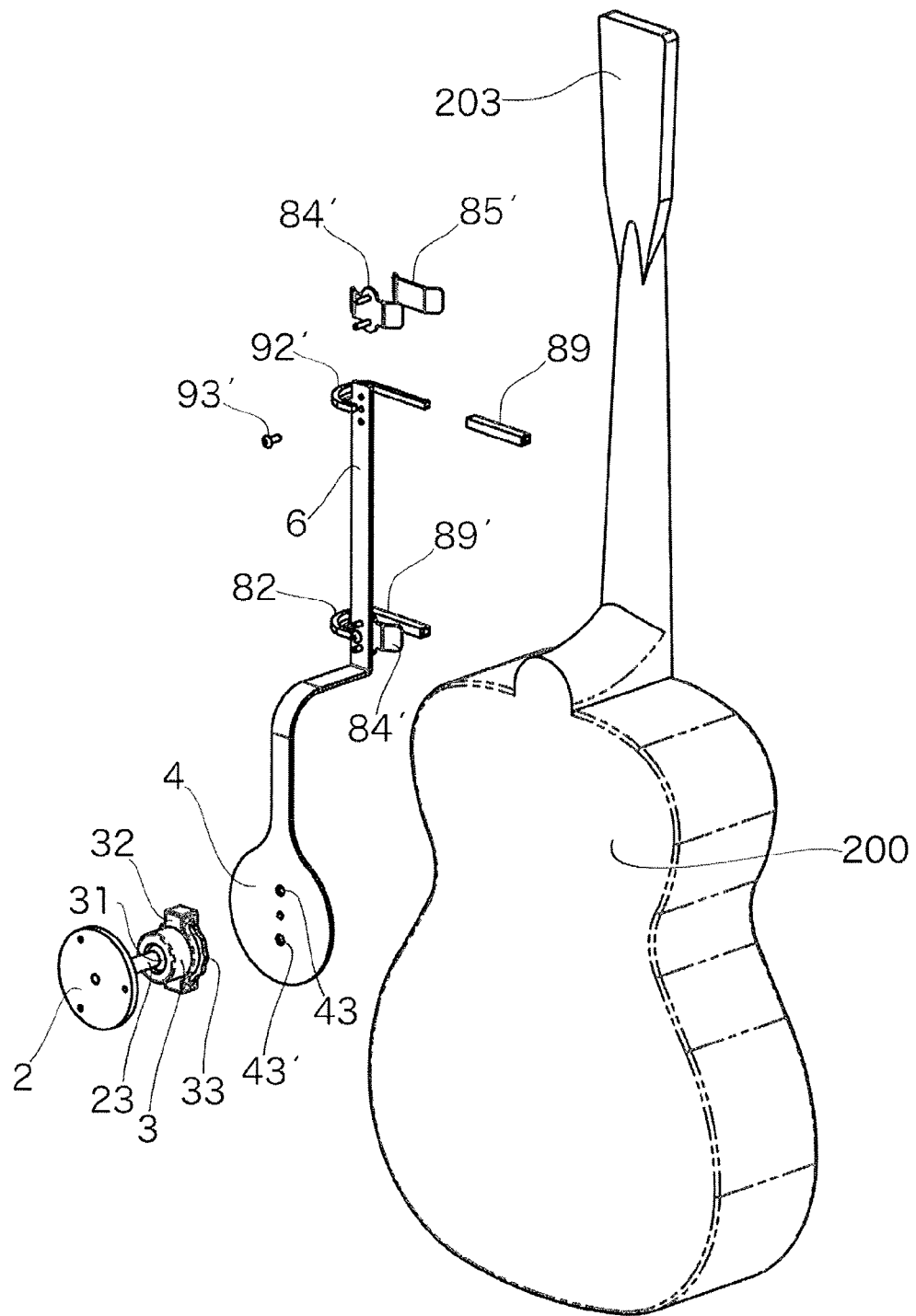
FIG. 12 shows a perspective view of a standard guitar with an exploded view of the different parts of a third embodiment of a device according to the present invention.

FIG. 12 illustrates a third embodiment of the present invention, especially suited to standard guitars which lack support studs.

The securing device of the third embodiment is similar to that shown for the first and second embodiments, as a result of which identical or similar members have been identified by the same numbers. These members will also not be explained in detail. The following explanation will therefore be concentrated on those members which differ between the second and the first embodiments.

As will be seen, in the third embodiment, the device is not connected to any support stud. In comparison with the first and second embodiments, it will be seen that the main plate -4- and the second plate -6- are joined together forming a single piece, without any need for pins between them. On the other hand, the arm of second plate -6- has two connecting members to neck -203-. It is specifically the connection through two points on the neck which securely suspends guitar -200-. In this case, the connecting members comprise a crook-shaped member -82-, -82'- which is attached to the structural member through the arm of second plate -6- and whose purpose is to contact the part of neck -203- over which the strings run. In the contact area, each crook -82-, -82'- is covered by an elastomeric sleeve -89-. The connecting members also comprise surfaces -84-, -84'- for contact with the opposite face of neck -203-. A layer of a foam -85'- material is located between these surfaces -84-, -84- to prevent damage to guitar -200-.

Figure 13:
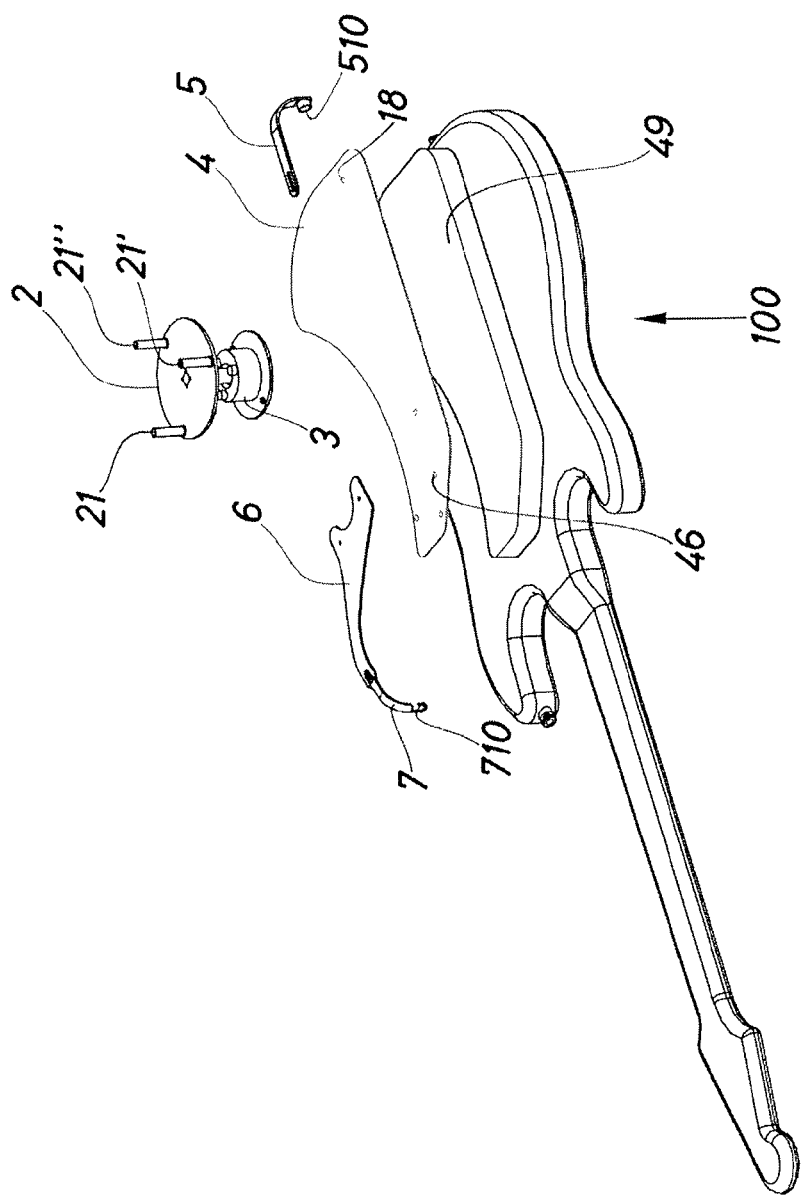
FIG. 13 shows a perspective view of another guitar with an exploded view of a fourth embodiment of a device according to the present invention.
Figure 14:
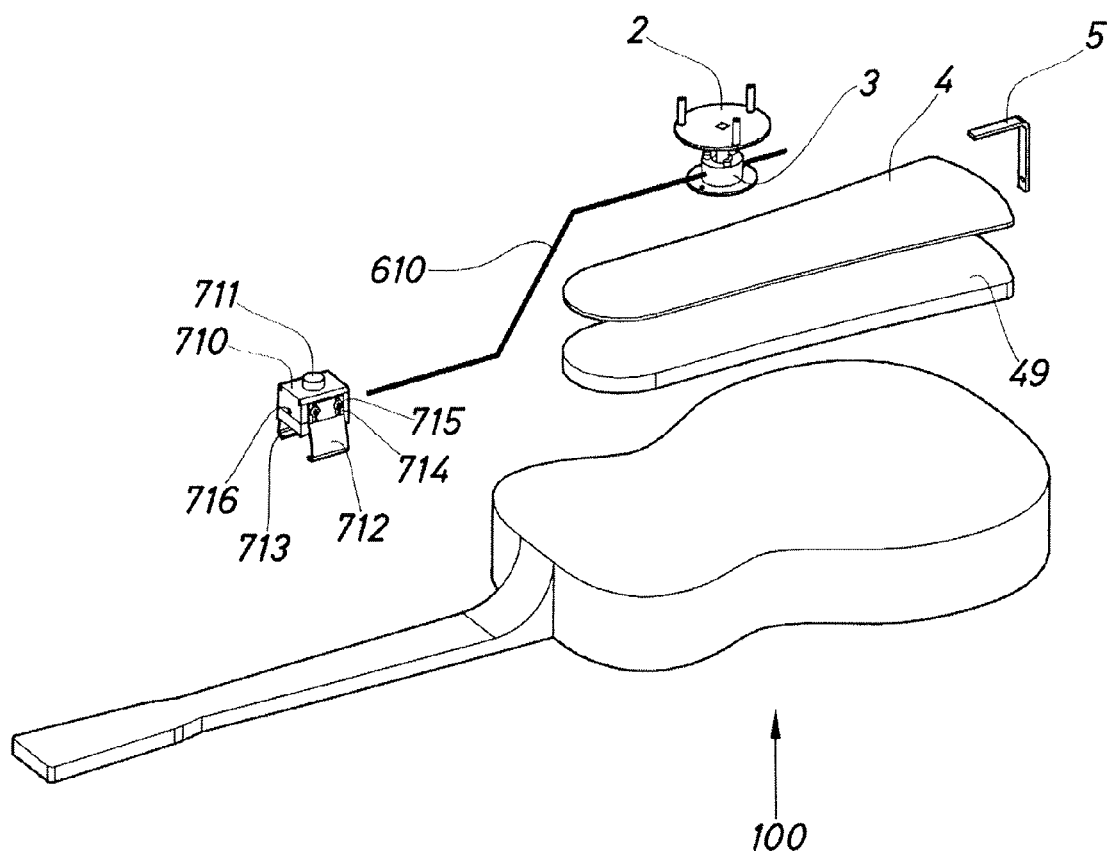
FIG. 14 shows a perspective view of another acoustic guitar with an exploded view of a fifth embodiment of a device according to the present invention.

FIGS. 13 and 14 show two further embodiments of a device according to the present invention. In these figures, identical or similar members to those illustrated in the previous embodiments have been identified by the same numbers.

With reference to the embodiment in FIG. 13, this is very similar to that in FIG. 1, the main variations in comparison with the first embodiment being brackets -5-, -7- which respectively connect the laminar member (specifically first plate -4-) to the support stud in the lower zone and the laminar member (specifically second plate -6-) to the support stud located on the shoulder of guitar -100-, which will be described below with reference to FIGS. 20 and 23 respectively.

Figure 6:
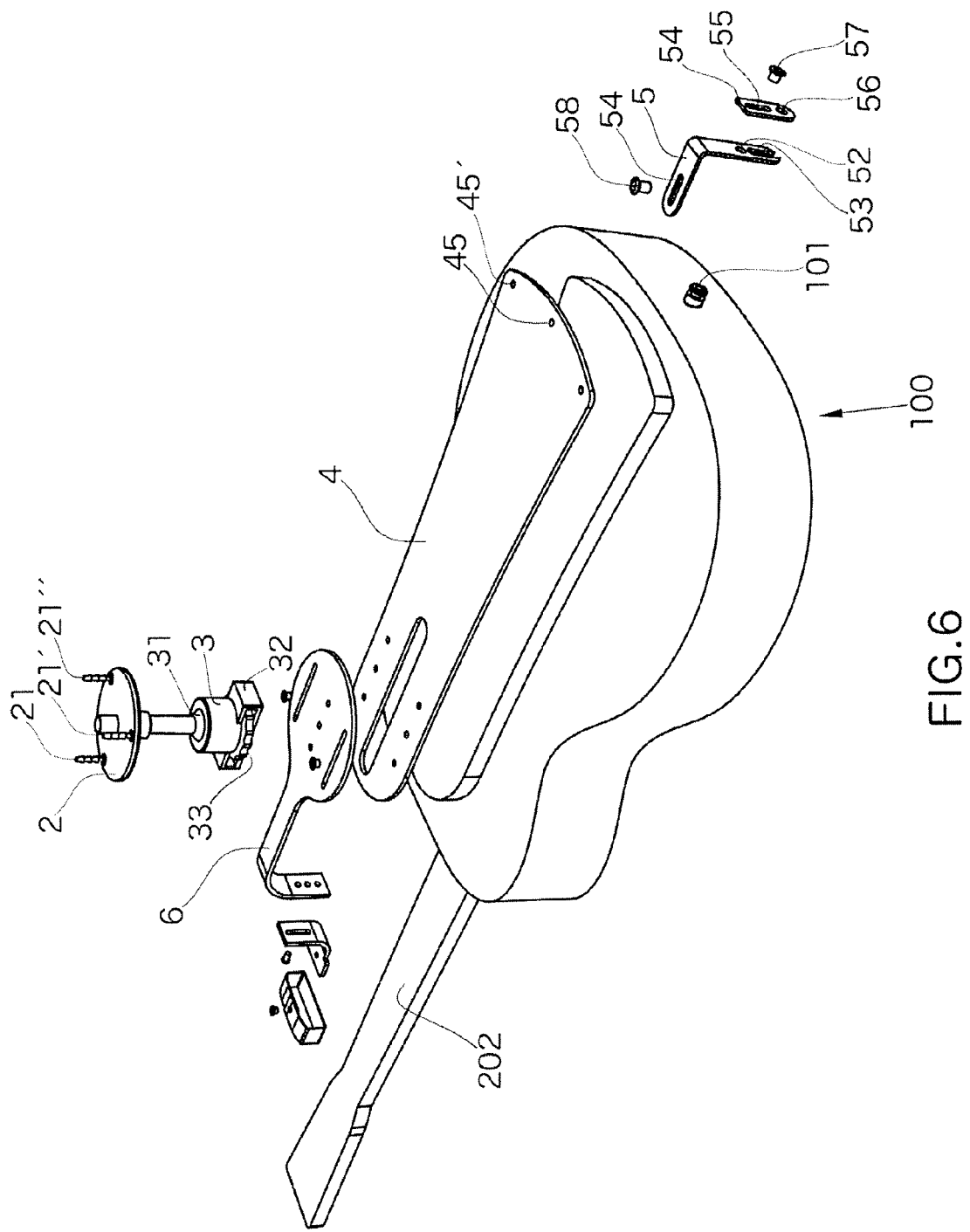
FIG. 6 shows a perspective view of an acoustic guitar with an exploded view of the different parts of a second embodiment of a device according to the present invention.
Figure 7:
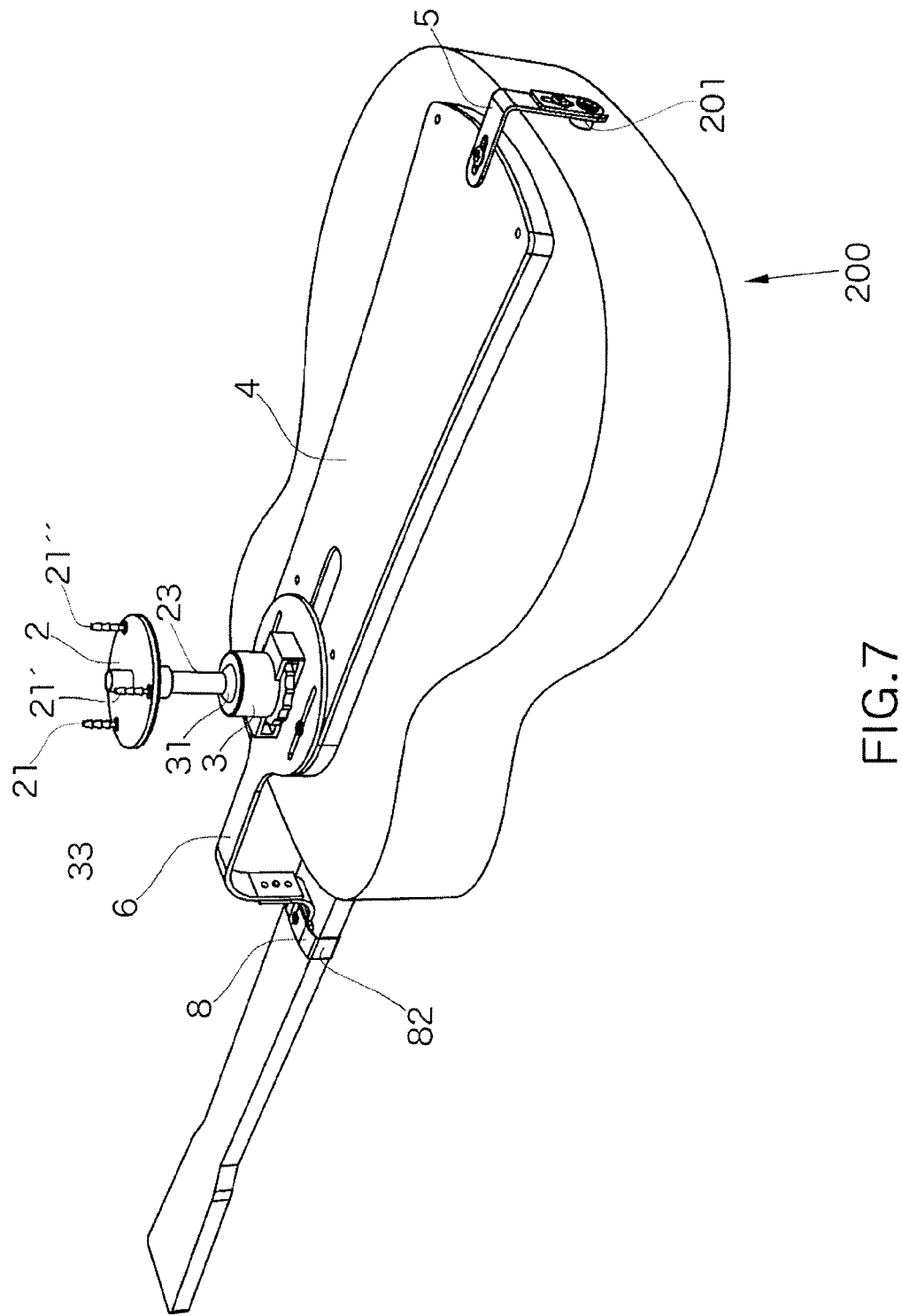
FIG. 7 is a perspective view of the second embodiment already mounted on an acoustic guitar.
Figure 8:
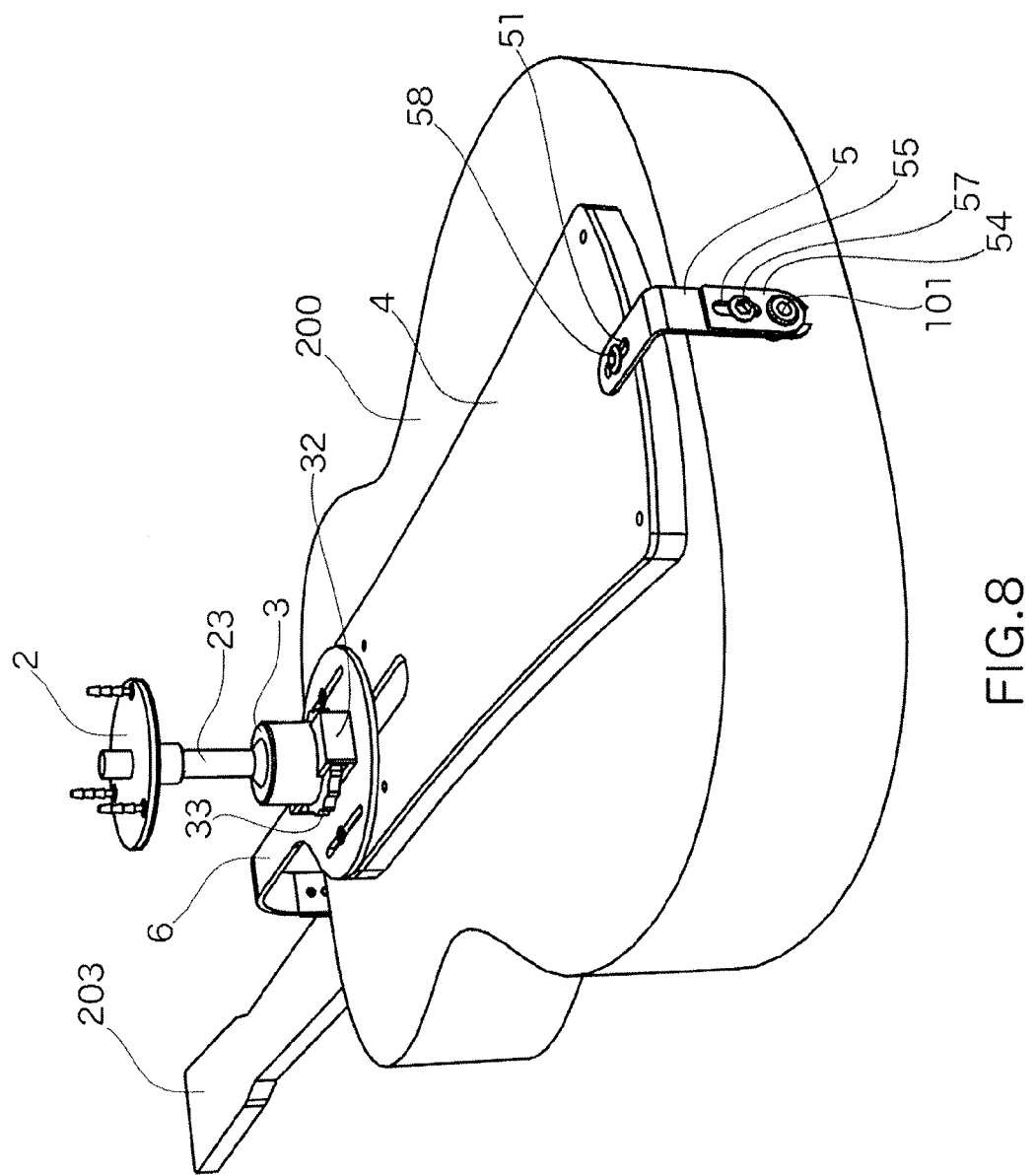
FIG. 8 is another perspective view of the second embodiment already mounted on an acoustic guitar from another viewpoint.
Figure 9:
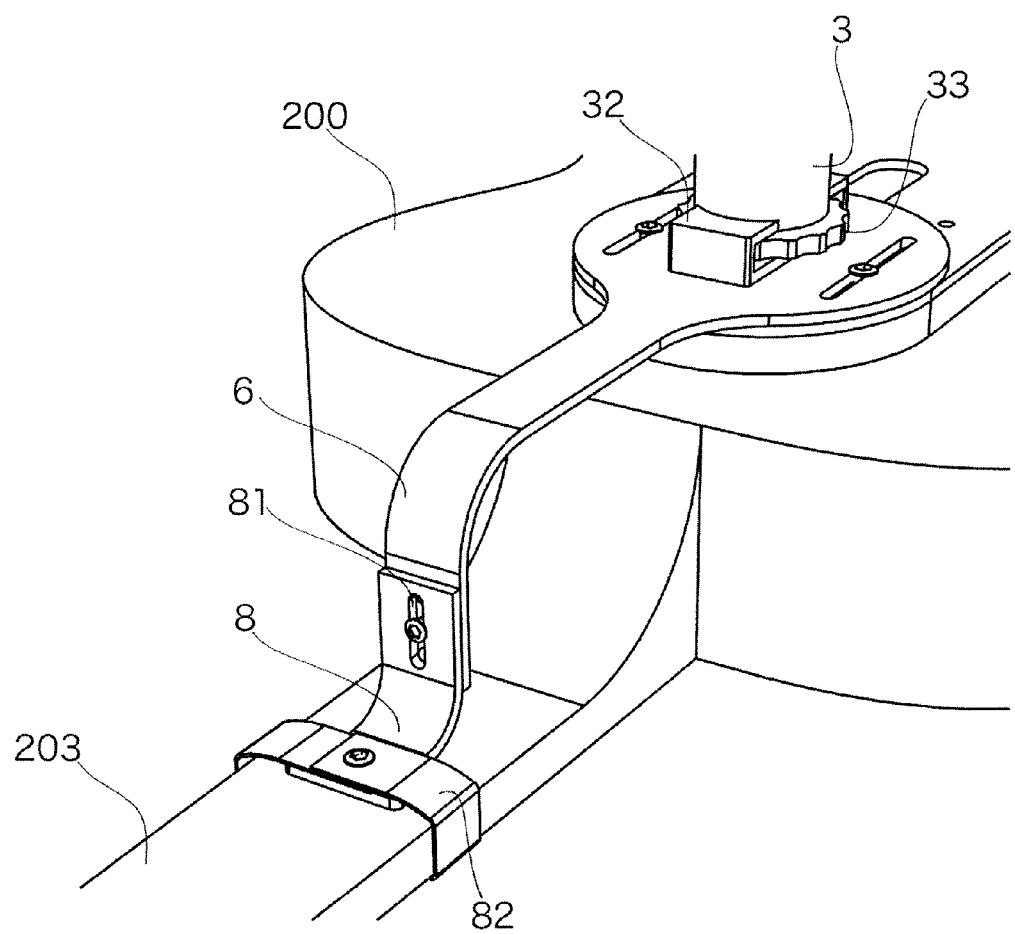
FIG. 9 is a perspective view in which the details of the connection between the device of the second embodiment and the guitar at the vicinity the neck of the guitar can be seen.
Figure 10:
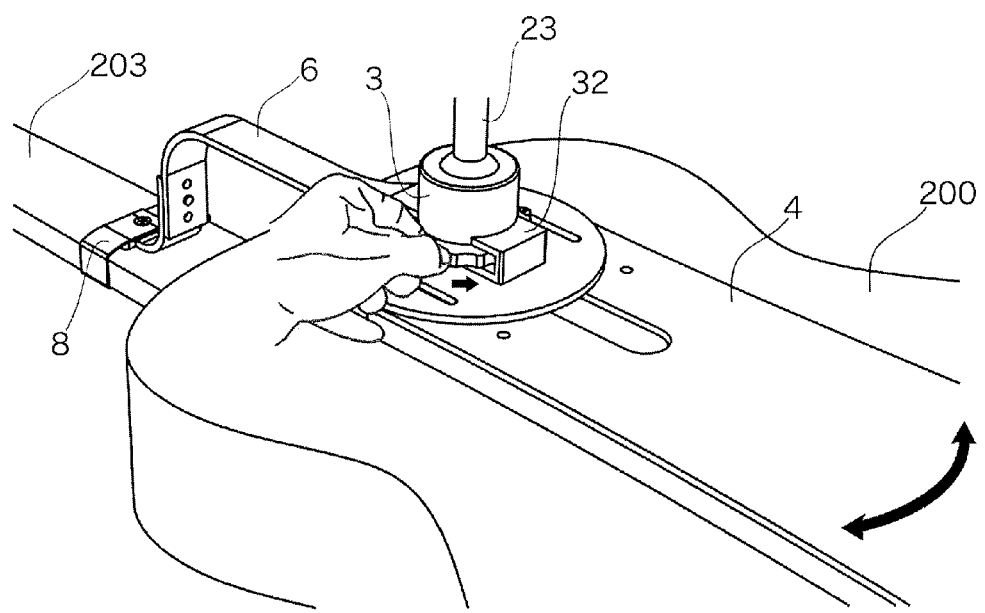
FIG. 10 is a perspective view illustrating a process of adjusting the second embodiment to the specific dimensions of the guitar illustrated.
Figure 11:
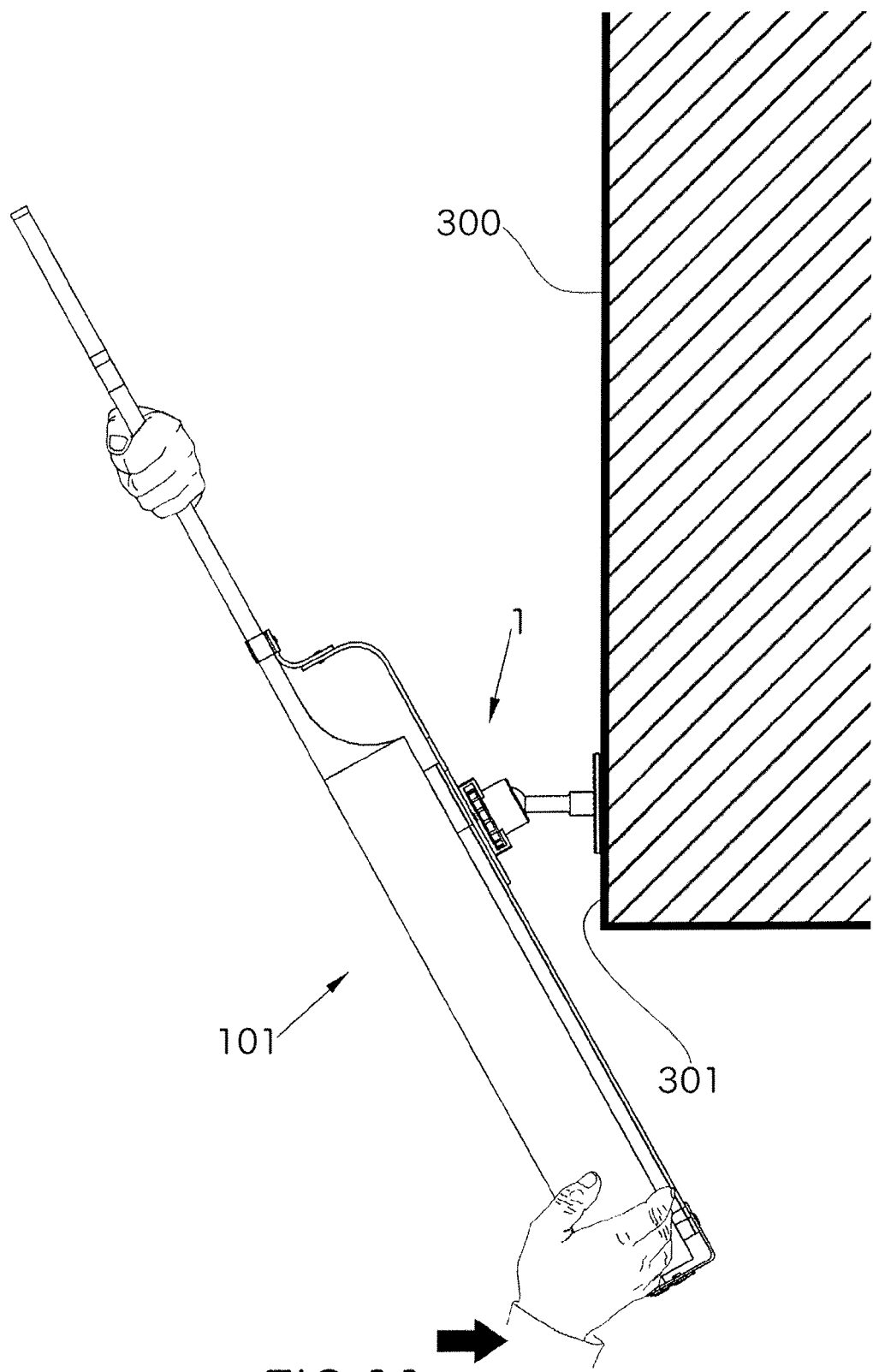
FIG. 11 is a diagrammatical view in which possibilities for positioning the second embodiment on a surface may be seen.

With reference to the embodiment in FIG. 14, this is similar to that in FIG. 6, the main differences being the ball and socket joint -3- which will be described below with reference to FIG. 15, the bracket connecting to stud -5-, which may be any of those illustrated in FIG. 19, 20, 21 or 23, and the device for connection to the neck, which will be described with reference to FIG. 22.

Figure 15:
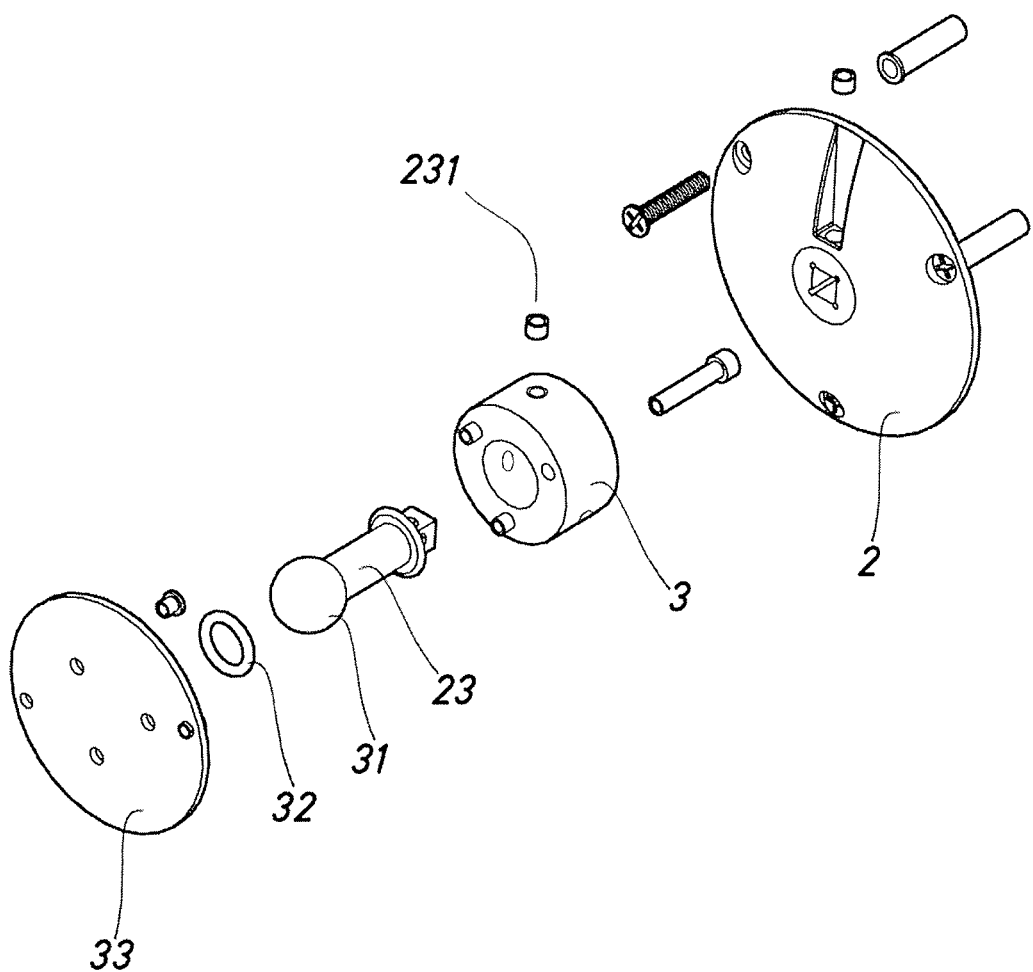
FIG. 15 shows a perspective view with the exploded parts of the ball and socket joint used in the embodiments in FIGS. 13 and 14.

FIG. 15 shows an alternative embodiment of the connecting members to a wall which differs from those illustrated in FIGS. 1 to 12. In the figure, we can see a disk -2- connecting to the wall and a ball and socket joint member -3- which has within it a spherical member -31- and an arm -23- which joins ball and socket joint -3- to wall disk -2-. The assembly is completed through a pierced disk -33- or internal housing for connection to the laminar member (specifically plate -4-) and a ring seal which provides a good movable connection between spherical member -31- and internal housing -33- and prevents the ball and socket joint from rotating freely through the force of the weight of the guitar being supported. This assembly makes free rotation movement possible so that the guitar can be inclined as desired. The position of the ball and socket joint is fixed by tightening grub screw -231-.

Figure 16:
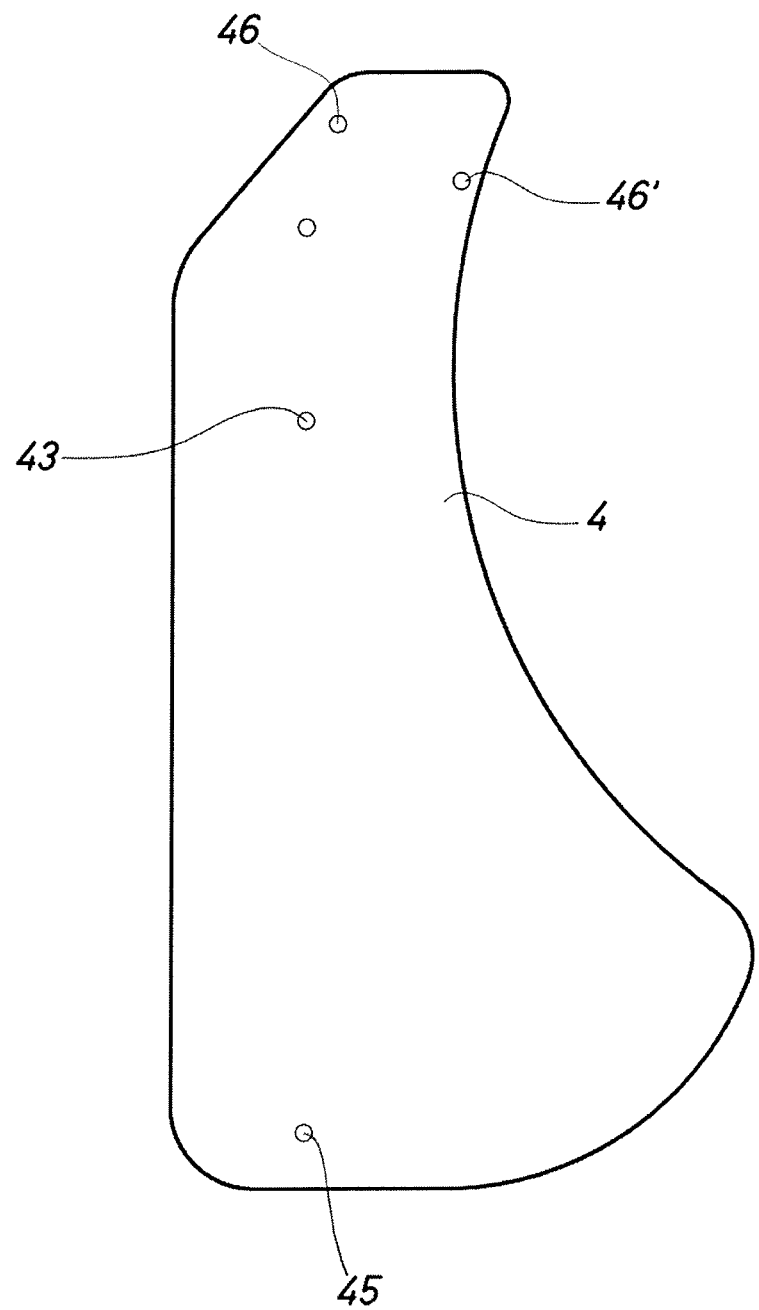
FIGS. 16, 17 and 18 show three different embodiments of the laminar member or plate with its contours matching the contours of different guitars, and with different distributions of orifices.
Figure 17:
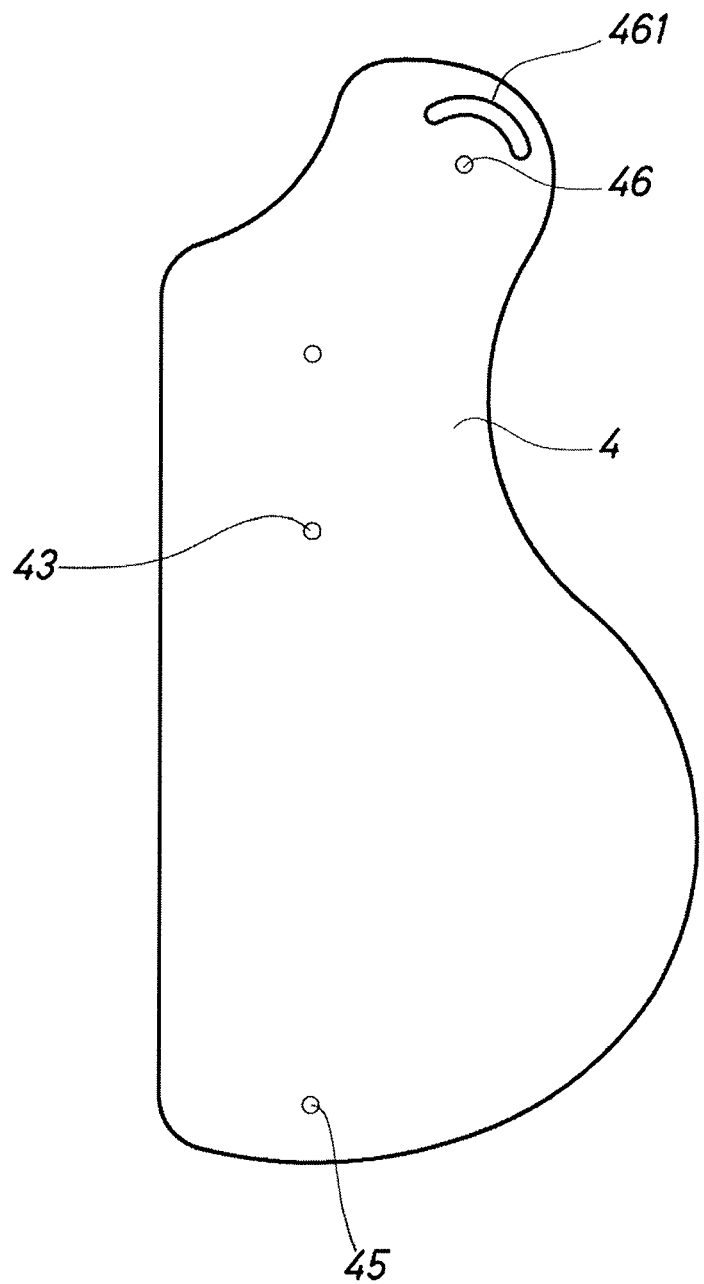
Figure 18:
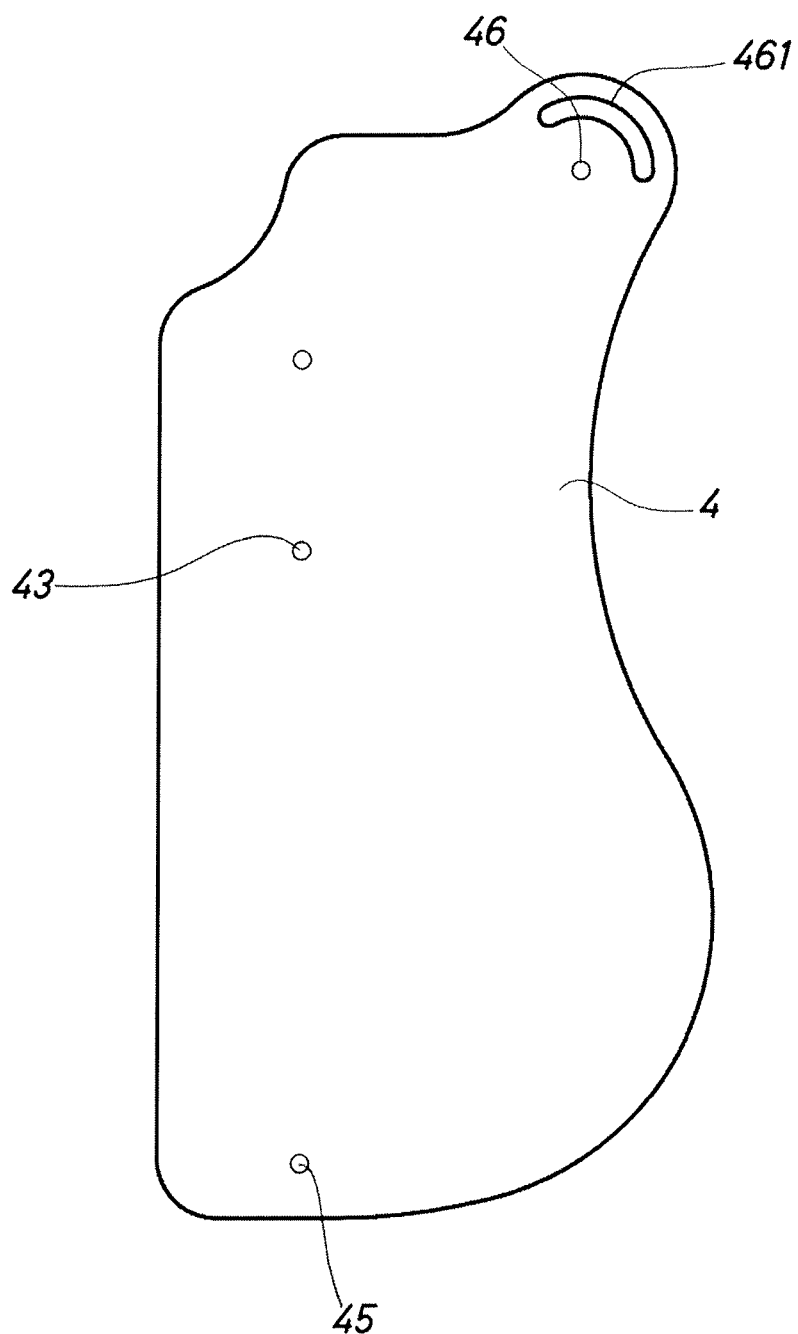

FIGS. 16, 17 and 18 show three embodiments of plate -4- or main plate forming the laminar member of the device according to the present invention. As will be seen, the contour of plate -4- matches the contour of a different type of guitar, as do the positions of orifices -43-, -46-, -46'-, -45- according to the locations of the studs on the guitars. In the embodiments in FIGS. 17 and 18, elongated opening -461- permits adjustments to guitars with different shoulder geometries but which essentially share the shape of the main body of the guitar. Orifices or holes -43-, -45-, -46-, -46'- may be threaded.

Figure 19:
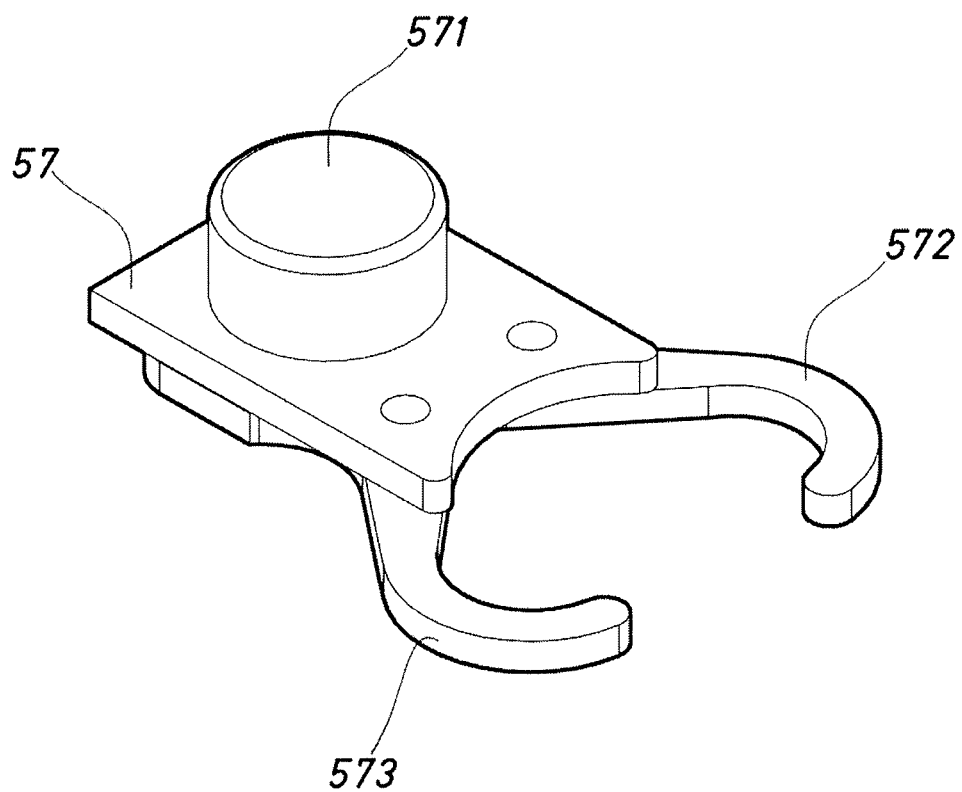
FIG. 19 shows in perspective a clamp member which can be used to secure the structural member to the stud of a guitar.

FIG. 19 illustrates a device for a stud connection which can be connected for example to the brackets for connection to a stud or, according to circumstances, directly to one of plates -4-, -6- forming the laminar member. This member -17- has two clamp arms -572-, -573- which can be tightened by means of a knob -571-.

Figure 20:
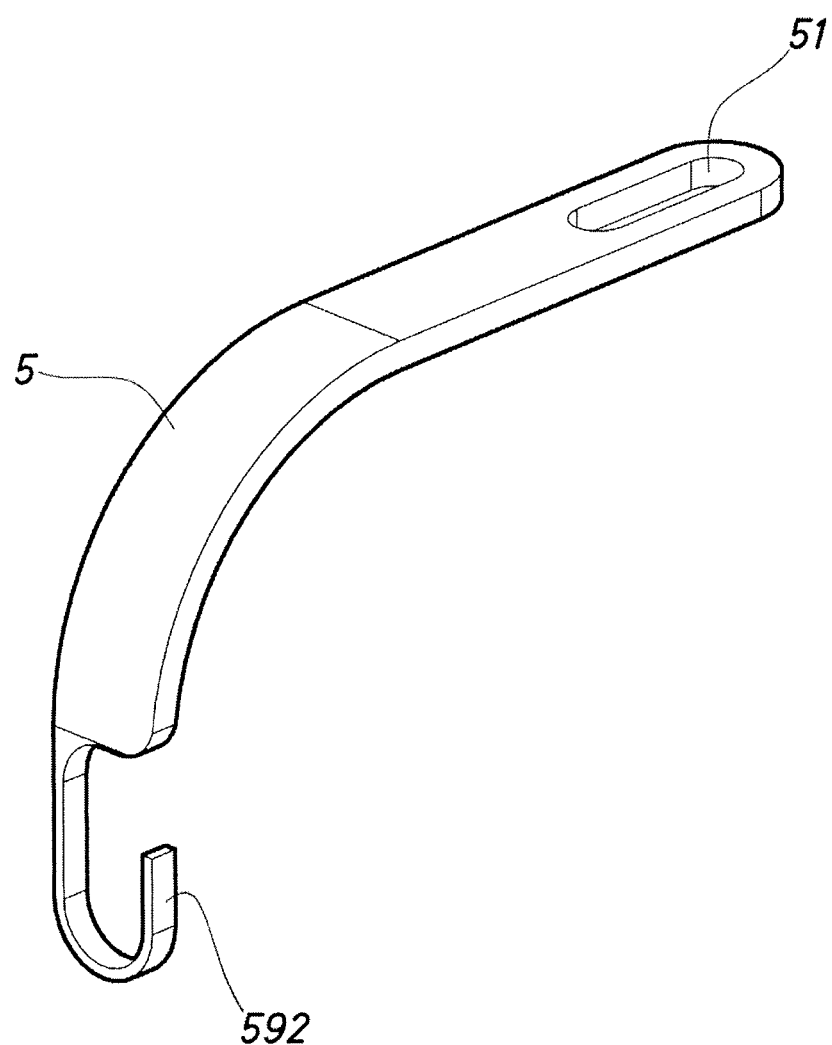
FIG. 20 shows a perspective view of an example of an embodiment of the laminar bracket to join the laminar member to the stud of a guitar, with a hook for connection to the stud.

FIG. 20 shows an alternative embodiment of laminar bracket -5- for connection to a stud. Bracket -5- has an elongated opening -54- for connection to the laminar member and a hook -592- for connection to a stud of the guitar, which will normally be the upper stud located on the shoulder of the guitar.

Figure 21:
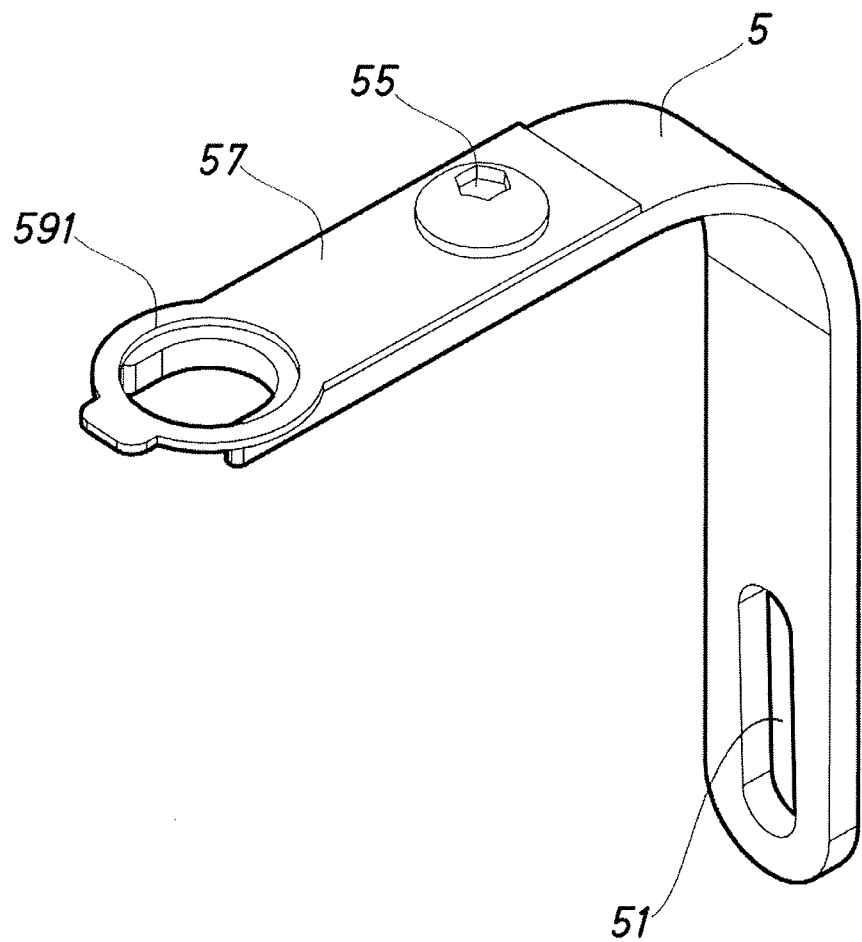
FIG. 21 shows another perspective view of another example of an embodiment of the bracket for connection to a stud.

FIG. 21 shows another embodiment of bracket -5-.

In this case, the connection to the stud is made through a bent plate -57-, -591- which is attached to the bracket by means of threaded connection -55-.

Figure 22:
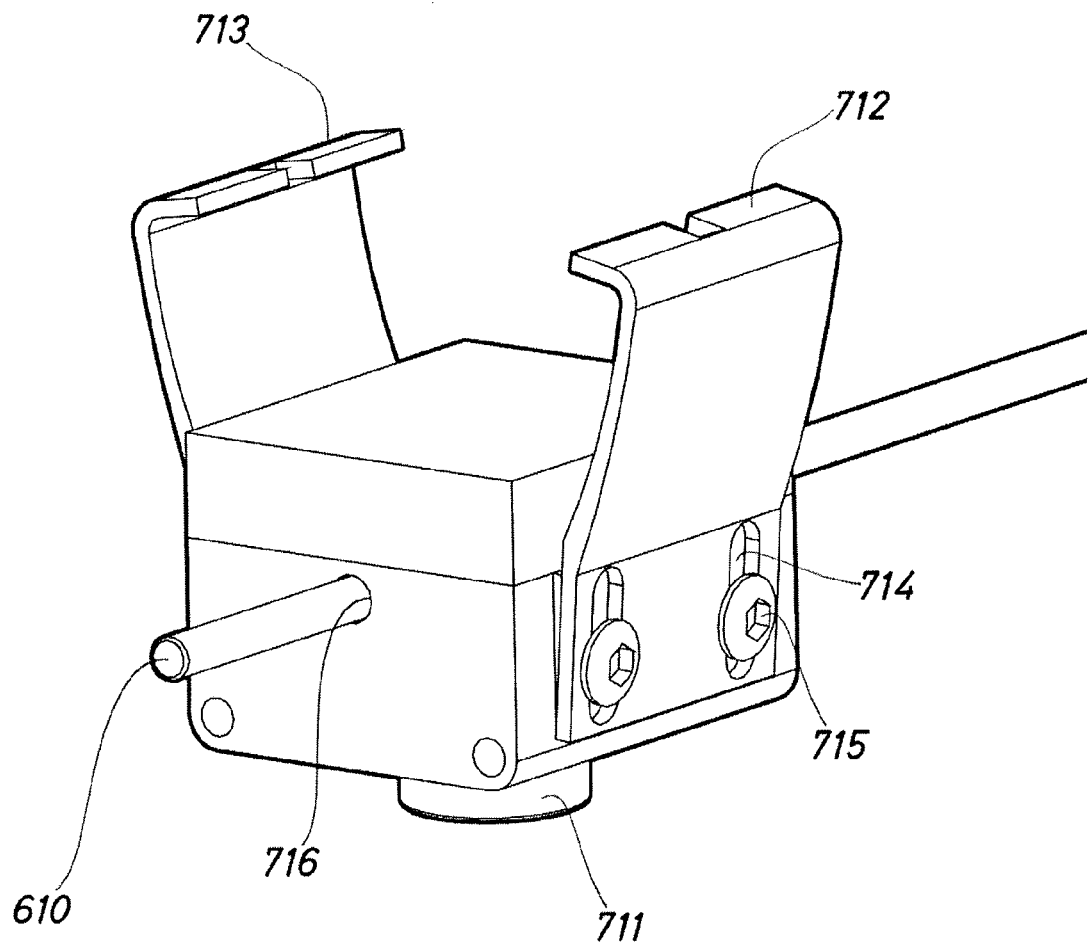
FIG. 22 shows a perspective view of a device for connection to the neck of a guitar through a system of adjustably positioned clamps.

FIG. 22 shows an alternative embodiment of a connecting member to the neck, which is especially applicable to acoustic guitars (which often lack the stud on the shoulder of the guitar). This embodiment incorporates a pair of members -712-, -713- in the form of clamps which can be adjustably attached to the body of the device through an elongated opening -714- and screw -715- system which can be operated by means of tool of the Allen type. The mechanism can slip along a rod -610-, of for example stainless steel, which slides through a through hole -716- in the device. The device has a control -711- to fix the relative position of the body of the device and rod -610-. The device also comprises a cushion to receive the neck of the guitar.

Figure 23:
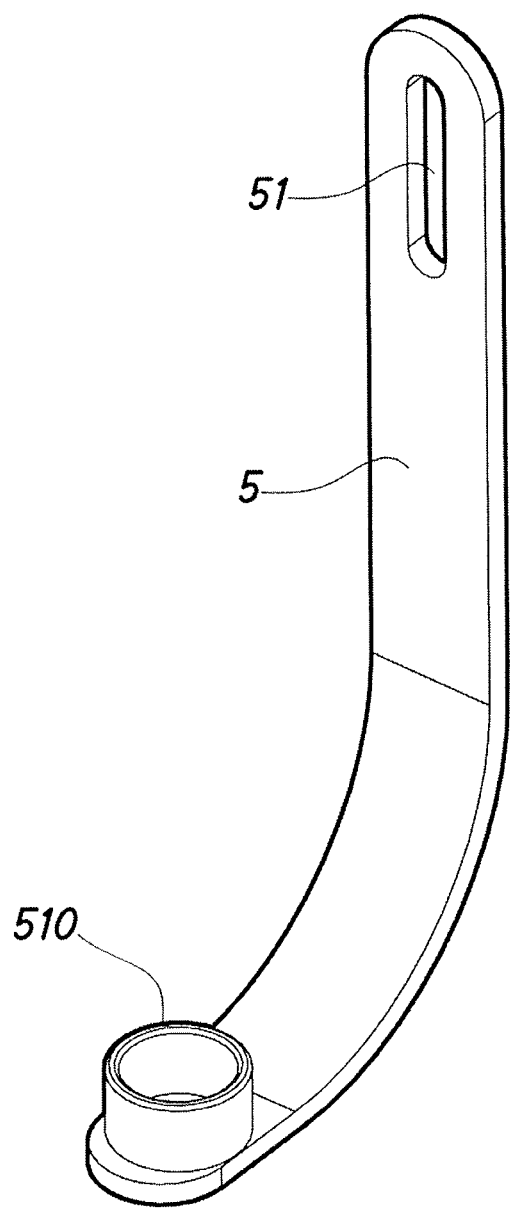
FIG. 23 shows a perspective view of a further embodiment of a laminar bracket attached to the stud of a guitar.

FIG. 23 shows an embodiment of a laminar bracket -5- which especially applies to the connection with the lower stud of a guitar. This bracket -5- incorporates a ladle-shaped member -510- which houses the lower stud of the guitar, allowing the latter to be easily fitted.

Figure 24:
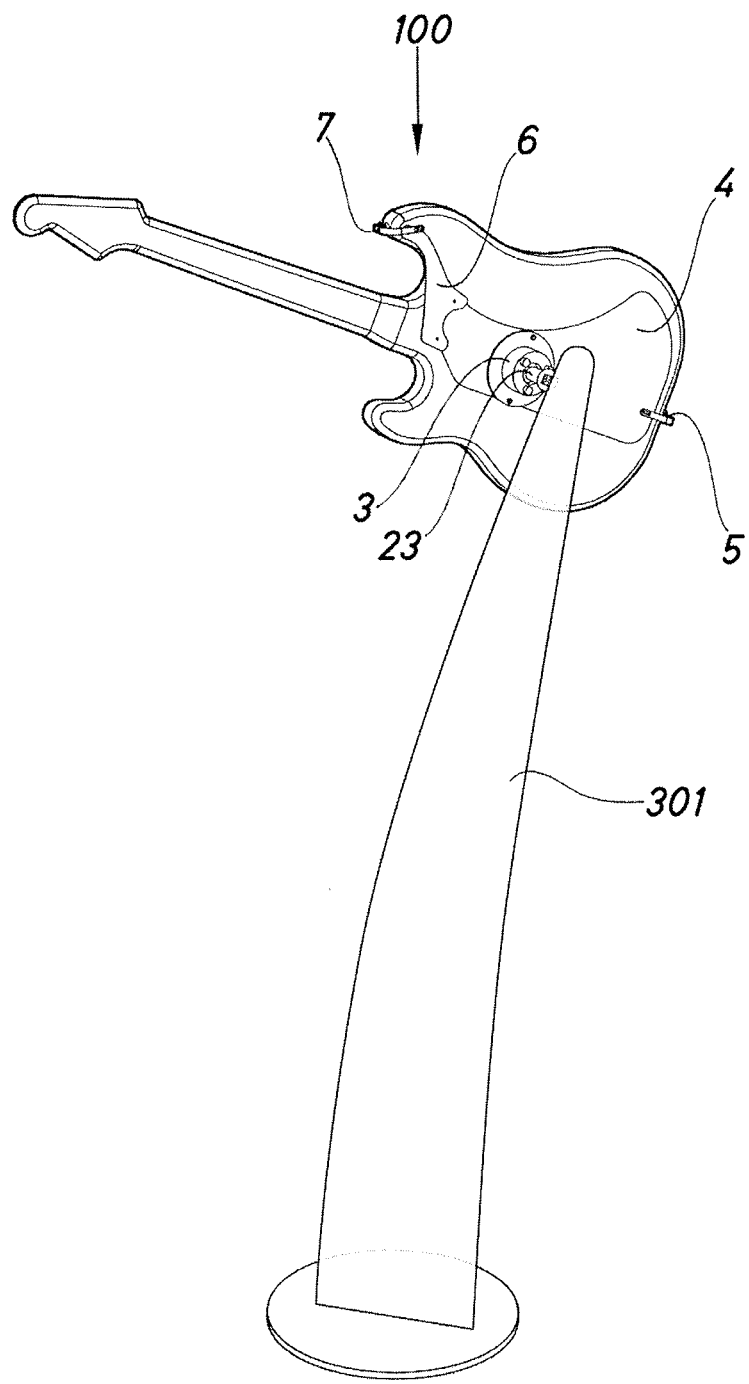
FIG. 24 shows a perspective view of a sixth embodiment of the device according to the present invention which is similar to that in FIG. 13, but which differs from it in that the device is attached to a pedestal supported on a horizontal surface.

FIG. 24 shows an embodiment similar to FIG. 13 in which the device according to the present invention supports guitar -100- on a pedestal -301- standing vertically on the ground.

The present invention may be constructed using different materials: metals, plastics, wood, etc. For example, the metal members may be made of 304 stainless steel sheet and/or sheet iron. For example, the parts, the housing of the ball and socket joint, the base supporting the ball and socket joint, the ball and socket joint and the securing wheel for the guitar may be made of 304, the pins (which may be pins or threads, as selected) of any type of stainless steel, the connecting disk to the wall may be made of painted sheet iron. Preferably, the plates may have a thickness of 3 to 2 mm, the wall disk a thickness of 4 mm. The foam materials used to protect contact between the steel and the guitar may be of 45PPI filtering material 30 mm thick and may be secured to the plate, for example, by means of double-sided adhesive.

The invention claimed is:

1. A guitar-securing device comprising:
    (a) an attachment member, comprising an arm configured to effect attachment to a surface,
    (b) a structural member that is connected to the arm and passes along a back part of a guitar, and
    (c) a first connecting member that connects the structural member to a first guitar stud configured to affix a belt to the guitar,
    wherein the structural member further comprises a first laminar member located on the back part of the guitar,
    wherein the structural member further comprises a second laminar member connected to the first laminar member, wherein a relative position between the first and second laminar members varies, and
    wherein the structural member further comprises a pin for adjusting the relative position, wherein one of the first and second laminar members comprises an elongated opening while the other one of the first and second laminar members comprises a set of smaller openings corresponding to the elongated opening, and wherein the one pin passes through the elongated opening and one of the smaller openings.

2. The device according to claim 1, wherein the attachment member further comprises a universal joint at one end of the arm, and the device further comprises an intermediate connecting member that rotates the structural member with respect to the universal joint, wherein the intermediate connecting member is connected to the structural member and located between the structural member and the universal joint, and wherein the intermediate member further comprises a wheel configured to adjust an angle of rotation between the universal joint and the structural member.

3. The device according to claim 1, wherein the first connecting member is a laminar bracket, and wherein the laminar bracket and the structural member are connected by a pin, wherein the structural member comprises an opening while the laminar member comprises a corresponding elongated opening, and wherein the pin is capable of passing through the opening and the corresponding elongated opening.

4. The device according to claim 3, wherein the structural member further comprises additional openings to vary the relative position between the laminar bracket and the structural member.

5. The device according to claim 1, wherein the first connecting member is a laminar bracket, and wherein the first guitar stud and the laminar bracket are joined together by an intermediate laminar member which has an opening configured to receive the first guitar stud and an elongated opening corresponding to a smaller opening in the laminar bracket arranged in such a way that a pin passes through them.

6. The device according to claim 5, wherein the laminar bracket further comprises a recess to receive a first guitar stud configured to affix a belt to the guitar.

* * * * *